(12) United States Patent
Babka et al.

(10) Patent No.: US 7,334,055 B2
(45) Date of Patent: *Feb. 19, 2008

(54) STATUS DISPLAY FOR PARALLEL ACTIVITIES

(75) Inventors: James Joseph Babka, Round Rock, TX (US); Chris Alan Schwendiman, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 638 days.

This patent is subject to a terminal disclaimer.

(21) Appl. No.: 10/633,243

(22) Filed: Aug. 1, 2003

(65) Prior Publication Data

US 2004/0025006 A1 Feb. 5, 2004

(51) Int. Cl.
*G06F 3/00* (2006.01)
*G06F 9/00* (2006.01)

(52) U.S. Cl. .............. 710/19; 710/8; 710/16; 710/17; 710/18; 715/700; 715/735; 713/1; 713/2; 713/100

(58) Field of Classification Search ........... 710/15–19, 710/52–57, 104; 713/1, 2, 100
See application file for complete search history.

(56) References Cited

U.S. PATENT DOCUMENTS

| | | | | |
|---|---|---|---|---|
| 4,890,257 A | | 12/1989 | Anthias et al. ............. | 364/900 |
| 5,113,522 A | | 5/1992 | Dinwiddie, Jr. et al. .... | 395/700 |
| 6,078,306 A | * | 6/2000 | Lewis ....................... | 345/685 |
| 6,119,185 A | | 9/2000 | Westerinen et al. ......... | 710/104 |
| 6,138,123 A | | 10/2000 | Rathbun .................... | 707/201 |
| 6,154,836 A | * | 11/2000 | Dawson et al. ............. | 713/1 |
| 6,249,520 B1 | | 6/2001 | Steely, Jr. et al. .......... | 370/368 |
| 6,292,890 B1 | * | 9/2001 | Crisan ....................... | 713/2 |
| 6,295,534 B1 | | 9/2001 | Mann ........................ | 707/10 |
| 6,349,320 B1 | | 2/2002 | Emberton et al. .......... | 709/100 |
| 6,496,893 B1 | * | 12/2002 | Arai .......................... | 710/302 |
| 6,934,956 B1 | * | 8/2005 | Allen ......................... | 719/327 |
| 2001/0011284 A1 | * | 8/2001 | Humpleman et al. ....... | 707/511 |

OTHER PUBLICATIONS

Running Linux, 3rd Edition by Matt Welsh, sections 5.3 and section 5.4.*
Linux and Unix Shell Programming by David Tansley, section 28.4.*
SUSE Linux 10 Unleashed by Michael McCallister, section title: "System and Services and Runlevels".*
Managing Linux Systems with Webmin System Administration and Module Development by Jamie Cameron, Chapter 9.*

* cited by examiner

*Primary Examiner*—Alan S. Chen
(74) *Attorney, Agent, or Firm*—Winstead PC

(57) ABSTRACT

When activities are operated in parallel, and there is only one status display, an ordered list is implemented with three methods of access: insertion at the top, removal from anywhere, and read of the top item. Items kept on this list are the status codes or words for the activities that are currently in progress. When a new activity begins, its status code or word is inserted at the top of the list. Whenever an activity completes, its code or word is removed from the list regardless of its location in the list, and in such a way as to preserve the order of the remaining entries in the list. Whenever the top entry in the list changes (whether through an insertion or removal), the single status display is updated to show the new top value.

18 Claims, 3 Drawing Sheets

STATUS DISPLAY FOR PARALLEL ACTIVITIES

CROSS-REFERENCE TO RELATED APPLICATION

The present application is related to U.S. patent application Ser. No. 09/389,194, entitled "System and Method for Maintaining Device Name Consistency During Parallel Device Discovery Processes," which is hereby incorporated by reference herein.

TECHNICAL FIELD

The present invention relates in general to displaying the status of an activity within a data processing system.

BACKGROUND INFORMATION

To enable problem determination and to provide indications of progress, many data processing systems display a status code or word that indicates what activity is currently taking place. As tasks are completed, the status code or word is changed to reflect the next activity that takes place. If a particular activity fails to complete, the user becomes aware because the status codes stop changing. Moreover, by observing the status code, the user can determine which activity failed to complete, and thus can focus problem diagnosis activities on the proper system component.

However, if there is only a single location for displaying a single status code or word, then there is a problem in determining what should be displayed when these activities are occurring in parallel. The prior method for changing the display each time a new activity is started does continue to provide information on the progress of activities. However, it is inadequate for problem determination, because if any activity fails to complete, the code or word displayed is for the activity that was the last to be started, rather than for the activity that has actually failed to complete. This leads to improper diagnosis of problems, laying blame on the wrong activity, and lengthening problem determination time.

More specifically, such a status code display is used on RS6000 systems implementing the AIX operating system, available from International Business Machines Corp. When the configuration manager is operating, the device being configured is displayed in the status display. A problem occurs when the AIX operating system is configuring several attached devices in parallel, because it is often not possible to determine which device is having problems being configured. This problem is magnified when there are several hundred devices that need to be configured, and are done so in parallel.

Therefore, there is a need in the art to provide a status display that provides information on the progress of parallel activities, but also ensures that if any parallel activity fails to complete, its code or word will eventually be displayed.

SUMMARY OF THE INVENTION

The present invention addresses the foregoing need by ensuring that the code or word displayed still provides information on the progress of parallel activities, but also ensures that if any parallel activity fails to complete, its code or word will eventually be displayed, thus ensuring that problem determination activities begin with the proper component.

The present invention implements the foregoing using an ordered list with three methods of access: insertion at the top, removal from anywhere, and read (not removal) of the top item. The items kept on this list are the status codes or words for the activities that are currently in progress. When a new activity begins, its status code or word is inserted at the top of the list. Whenever an activity completes, its code or word is removed from the list regardless of its location in the list, and in such a way as to preserve the order of the remaining entries in the list. Whenever the top entry in the list changes (whether through an insertion or removal), the single status display is updated to show the new top value.

The effect of this is that every newly-started activity will have its status code or word displayed for at least a short time, which gives the observer a sense of the progress of the activities. The code displayed will always be for the latest-started activity that has not yet completed. If any activity is never going to complete, eventually all the other activities will complete, and their status codes or words will be removed from the list. This leaves only the "hung" activity's code on the list, and since it is the only entry, it will be the one displayed. Thus, the observer will know which activity failed to complete.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
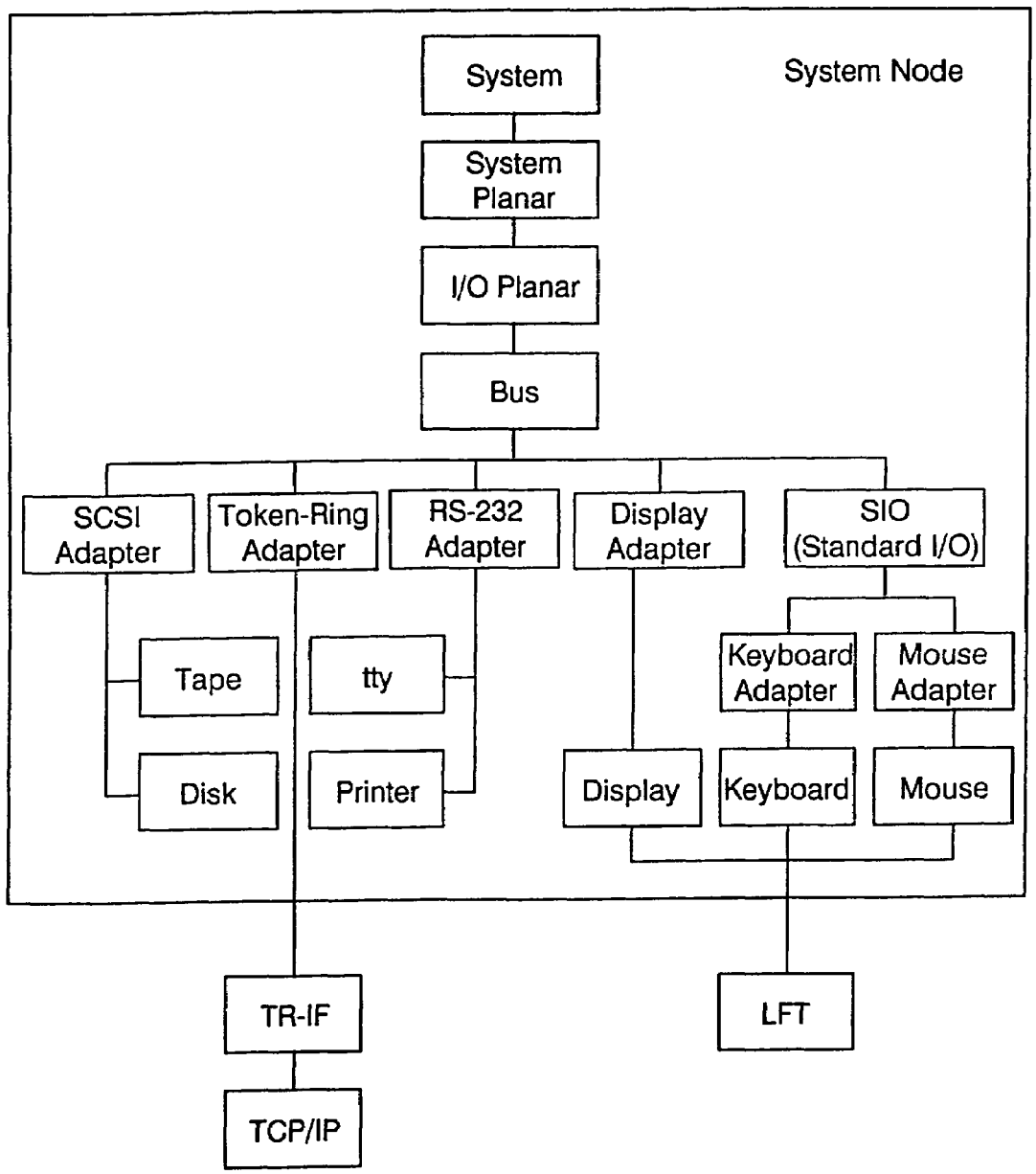
FIG. 1 illustrates an exemplary diagram of devices connected within a data processing system.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The following example is described with respect to the AIX operating system version 4.3, which is published at http:

\\\\www.rs6000.ibm.com\\doc_link\\en_us\\a_doc_lib\\aixgen\\topnav\\topnav.html, which is hereby incorporated by reference herein. However, the present invention is not limited in its applicability to the AIX operating system.

The present invention will be described below with respect to the configuration manager component of an AIX operating system. However, the concepts of the present invention may be expanded to other areas outside of this particular embodiment. The configuration manager is a rule-driven program that automatically configures devices in a data processing system during system boot and run time. When the configuration manager is invoked, it reads rules from the configuration rules object class and performs the indicated actions.

Devices are organized into a set of hierarchical tree structures. Individual entries in a tree are known as nodes and each represents a physical or logical device. Each tree represents a logical subsystem. For example, the tree containing the system node consists of all the physical devices in the system. Thus, the top node in the tree is the system node, which represents the system device, and has nodes connected below that represent individual pieces of the system. Below the system node is the system planar node, which represents the system planar in the system. Below the system planar node is one or more bus nodes, which represent the I/O buses in the system. Since adapter devices are connected to bus devices, adapter nodes fall below the bus nodes in the tree. The bottom of the hierarchy contains devices to which no other devices are connected. FIG. 1 illustrates an example of a connectivity and dependence diagram providing an example of the connections and dependencies of devices in a system.

Each rule in the configuration rules object class specifies a program name that the configuration manager must execute. These programs are typically the configuration programs for the devices at the top of the nodes. When these programs are invoked, the names of the next lower-level devices that need to be configured are returned. The configuration manager configures the next lower-level devices by invoking the configuration methods for those devices. In turn, those configuration methods return a list of to-be-configured device names. The process is repeated until no more device names are returned.

Figure 2:
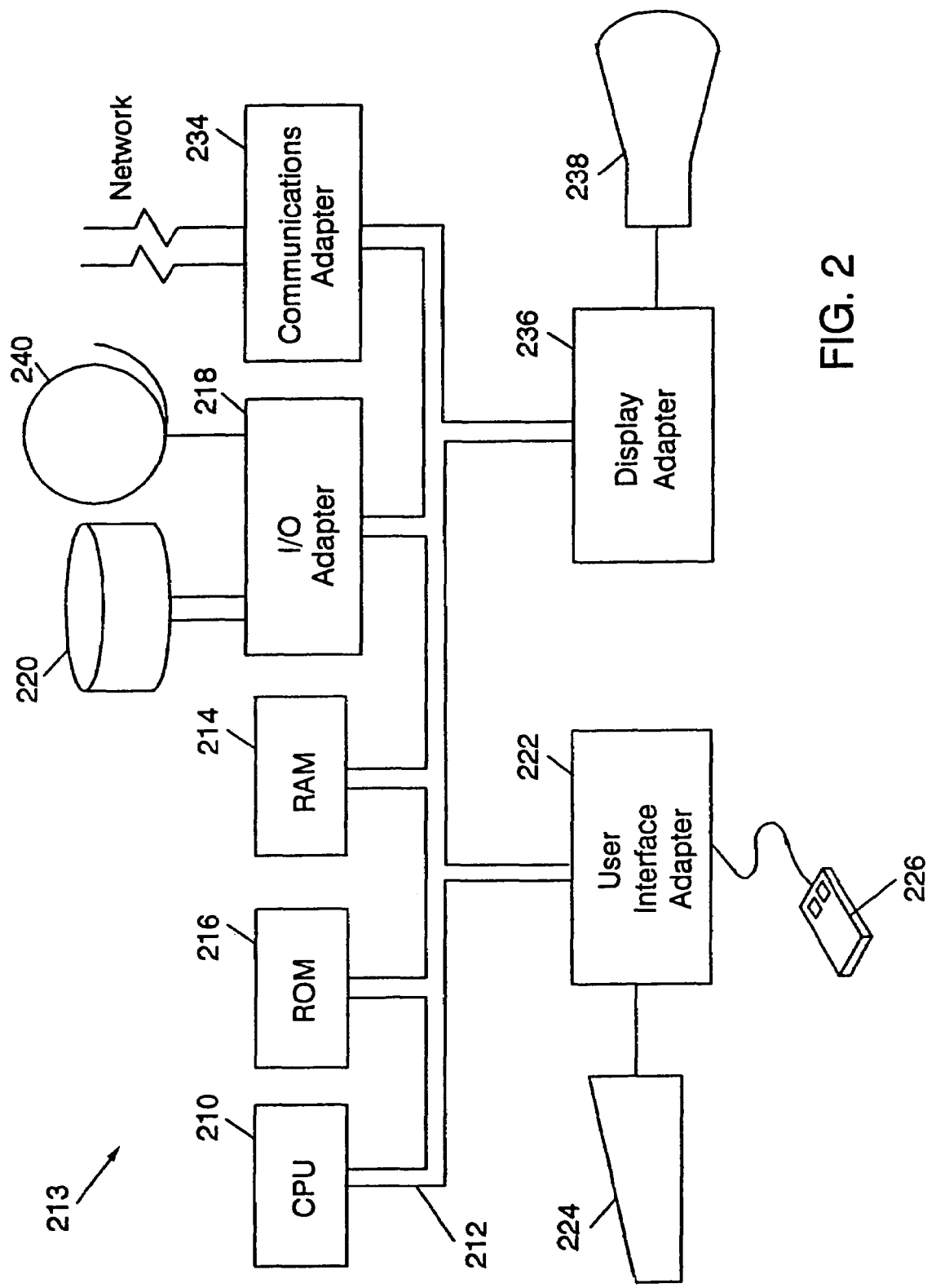
FIG. 2 illustrates a data processing system configurable in accordance with the present invention.

Referring next to FIG. 2, there is illustrated data processing system 213, which may be configured to operate in accordance with the present invention. System 213 shows only a few of the devices that may be attached to the system, such as illustrated in FIG. 1. System 213 in accordance with the subject invention includes one or more central processing units (CPU) 210, such as a conventional microprocessor, and a number of other units interconnected via a system bus 212. System 213 includes a random access memory (RAM) 214, a read only memory (ROM) 216, and an input/output (I/O) adapter 218 for connecting peripheral devices such as disk units 220 and tape drives 240 to a bus 212, a user interface adapter 222 for connecting a keyboard 224, a mouse 226, and/or other user interface devices such as a touch screen device (not shown) to the bus 212, a communication adapter 234 for connecting system 213 to a data processing network, and a display adapter 236 for connecting the bus 212 to a display device 238. CPU 210 may include other circuitry not shown herein, which will include circuitry commonly found within a microprocessor, e.g., execution unit, bus interface unit, arithmetic logic unit, etc. CPU 210 may also reside on a single integrated circuit.

Figure 4:
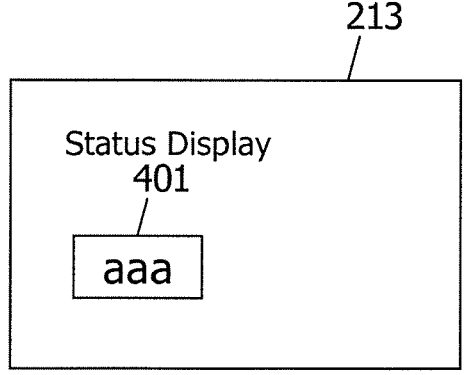
FIG. 4 illustrates the status display of the present invention.

FIG. 4 illustrates that on the chassis of system 213, a status display 401, which may be an LCD or LED display, is used to display the status of an activity operating within the system 213.

The status display is used to show the status of the AIX boot processes, including the configuration manager. As the configuration manager discovers devices that are attached to the system, it invokes configuration methods (the "activities" described above) to configure each device. Currently, AIX displays a unique three-digit code for each method when it begins. When a method completes, AIX invokes the next such method, displaying a new code.

As noted previously, when the configuration method is run, the display identifies the type of device that is presently being configured. If there is any faulty hardware, such faulty hardware could cause the boot process to stop prematurely (i.e. "hang"). The display gives a clue as to where the problem resides. Since the present version of the AIX now runs the configuration methods in parallel, without the present invention, the display of the "hung" method might not occur.

Preferred implementations of the invention include implementations as a computer system programmed to execute the method or methods described herein, and as a computer program product. According to the computer system implementation, sets of instructions for executing the method or methods are resident in the random access memory 214 or ROM 216 of one or more computer systems configured generally as described above. Until required by the computer system 213, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 3:
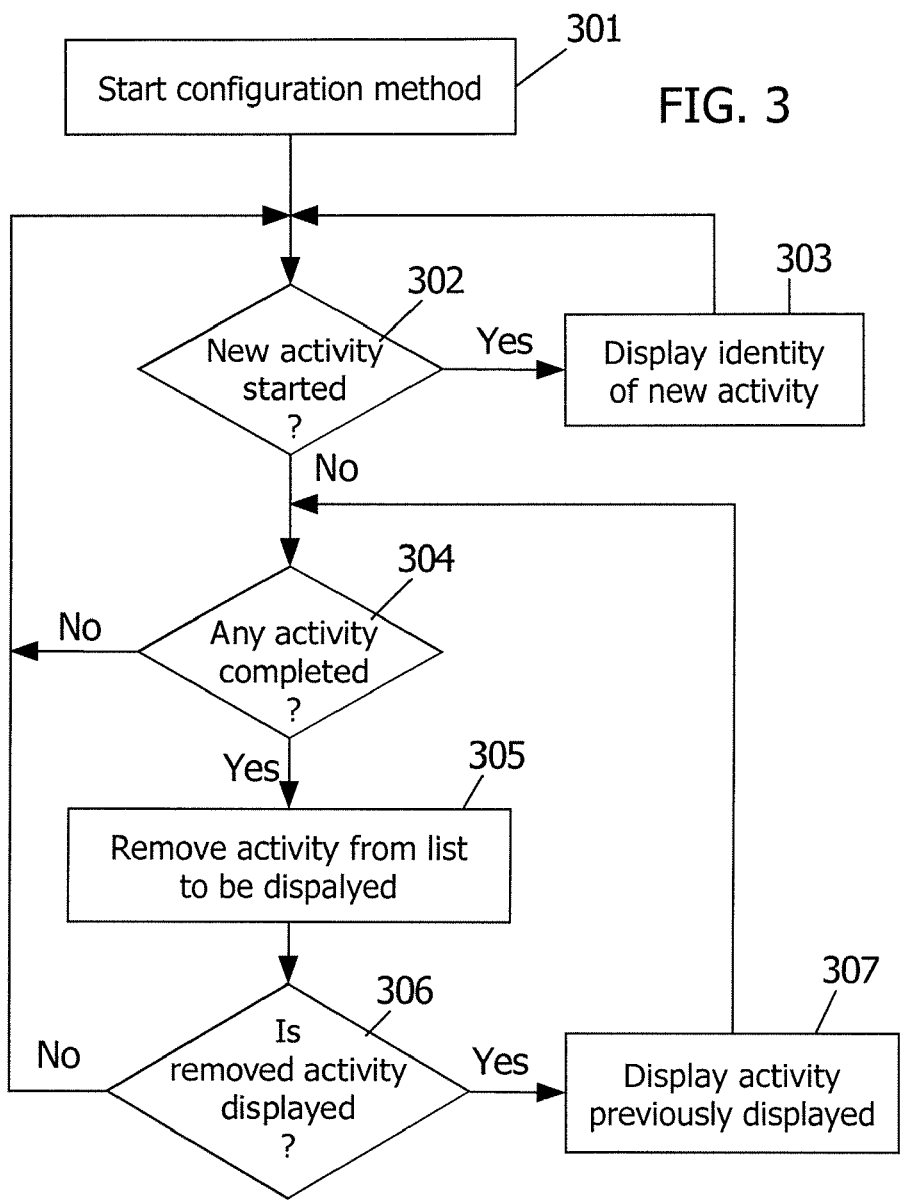
FIG. 3 illustrates a method for implementing an embodiment of the present invention.

The software implementing the present invention is represented by the flow diagram illustrated in FIG. 3. In step 301, the configuration method is begun. In step 302, a determination is made whether a new activity has started, such as the configuration of a new device. If yes, the process proceeds to step 303 to display the identity of the new activity, and the process loops back to step 302. The NO branch from step 302 proceeds to step 304 to determine if any activity has completed. If not, the process loops back to step 302. However, if in step 304, an activity has completed, then in step 305, that activity is removed from the list of activities to be displayed on the status display 401. Therefore, in step 306, a determination is made whether the removed activity is currently being displayed. If not, the process loops back to step 302. However, if in step 306 the removed activity is being displayed, the process proceeds to step 307 to display the activity previously displayed. The process then returns to step 304.

An example of the foregoing is illustrated in the following table:

| Action | List Contents | Display Contents with this invention | Display Contents without this Invention |
|---|---|---|---|
| Start Activity A | aaa | aaa | aaa |
| Start Activity B | bbb, aaa | bbb | bbb |
| Start Activity C | ccc, bbb, aaa | ccc | ccc |
| Activity B completes | ccc, aaa | ccc | ccc |
| Activity C encounters an error and hangs | ccc, aaa | ccc | ccc |
| Start Activity D | ddd, ccc, aaa | ddd | ddd |
| Start Activity E | eee, ddd, ccc, aaa | eee | eee |
| Start Activity F | fff, eee, ddd, ccc, aaa | fff | fff |
| Activity F completes | eee, ddd, ccc, aaa | eee | fff |
| Activity E completes | ddd, ccc, aaa | ddd | fff |
| Activity A completes | ddd, ccc | ddd | fff |
| Activity D completes | ccc | ccc | fff |

There are six activities, A-F, with status codes aaa through fff, respectively. The table shows the contents of the list and the display at each point in the evolution of a problem with Activity C that causes it to fail to complete. In the last column, the table shows what would be displayed if the process simply wrote out a new status code or word each time a new activity began. Notice that without the present invention, the observer loses any sense of progress once the last activity has begun (the display shows only "fff"), and there is no way for the user to know that Activity C has not completed. With the present invention, however, the display is much more useful. Longer-running activities (such as Activity D) will have their status codes or words eventually reappear on the display. Furthermore, it is seen that Activity C, which has become "hung," eventually has its status code reappear on the display 401, allowing the observer to determine which activity to investigate for problems after noting a lengthy period with no change in the contents of display 401.

Although the present invention and its advantages have been described in detail, it should be understood that various changes, substitutions and alterations can be made herein without departing from the spirit and scope of the invention as defined by the appended claims.

What is claimed is:

1. A method for configuring devices attached to a data processing system, comprising the steps of:
   (a) determining if configuration of a device has begun;
   (b) if configuration of a device has begun, inserting the configuration of the device in a list and displaying a code associated with the device;
   (c) determining if configuration of a device has completed;
   (d) if configuration of a device has completed, removing the configuration of the device from the list; and
   (e) if the configuration of the device removed in step (d) had its associated code displayed, displaying code associated with a configuration of a device immediately previous.

2. The method as recited in claim 1, further comprising the step of returning to step (b) if it is determined that configuration of a device has begun.

3. The method as recited in claim 1, further comprising the step of returning to step (a) if in step (c) it is determined that configuration of a device has not completed.

4. The method as recited in claim 1, further comprising the step of returning to step (a) if in step (e) the configuration of the device removed in step (d) had not had its associated code displayed.

5. The method as recited in claim 1, further comprising the step of returning to step (c) from step (e).

6. A computer program product embodied in a machine readable medium for configuring devices attached to a data processing system comprising the programming steps of:
   (a) determining if configuration of a device has begun;
   (b) if configuration of a device has begun, inserting the configuration of the device in a list and displaying a code associated with the device;
   (c) determining if configuration of a device has completed;
   (d) if configuration of a device has completed, removing the configuration of the device from the list; and
   (e) if the configuration of the device removed in step (d) had its associated code displayed, displaying code associated with a configuration of a device immediately previous.

7. The computer program product as recited in claim 6 further comprising the programming step of:
   returning to step (a) from step (b) if it is determined that configuration of a device has begun.

8. The computer program product as recited in claim 6 further comprising the programming step of:
   returning to step (a) if in step (c) it is determined that configuration of a device has not completed.

9. The computer program product as recited in claim 6 further comprising the programming step of:
   returning to step (a) if in step (e) the configuration of the device removed in step (d) had not had its associated code displayed.

10. The computer program product as recited in claim 6 further comprising the programming step of:
    returning to step (c) from step (e).

11. A system, comprising:

a processor;

an operating system running on said processor, wheren said operating system comprises a configuration manager, wherein said configuration manager comprises:

logic for inserting a code associated with a first device to a list if a configuration of said first device has begun;

logic for displaying said code associated with said first device;

logic for removing said code associated with said first device from said list if said configuration of said first device is completed; and logic for displaying code associated with a second device if said code associated with said first device is displayed, wherein said second device was previously immediately configured previous to said first device.

12. The system as recited in claim 11, wherein said configuration manager further comprises:

logic for displaying code associated with a device located at the top of said list.

13. The system as recited in claim 11, wherein said configuration manager further comprises:

logic for displaying code associated with a latest-started device to be configured that has not been completed configuration.

14. A system, comprising:

(a) circuitry for determining if configuration of a device has begun;

(b) circuitry for inserting the configuration of the device in a list and displaying a code associated with the device if configuration of a device has begun;

(c) circuitry for determining if configuration of a device has completed;

(d) circuitry for removing the configuration of the device from the list if configuration of a device has completed; and (e) circuitry for displaying code associated with a configuration of a device immediately previous if the configuration of the device removed had its associated code displayed.

15. The system as recited in claim 14 further comprising:

circuitry for returning to (a) from (b) if it is determined that configuration of a device has begun.

16. The system as recited in claim 14 further comprising:

circuitry for returning to (a) if in (c) it is determined that configuration of a device has not completed.

17. The system as recited in claim 14 further comprising:

circuitry for returning to (a) if in (e) the configuration of the device removed in (d) had not had its associated code displayed.

18. The system as recited in claim 14 further comprising:

circuitry for returning to (c) from (e).

* * * * *